Feb. 8, 1955 A. W. HOLSTEIN 2,701,698
FOOD MIXER
Filed Feb. 18, 1952 2 Sheets-Sheet 2

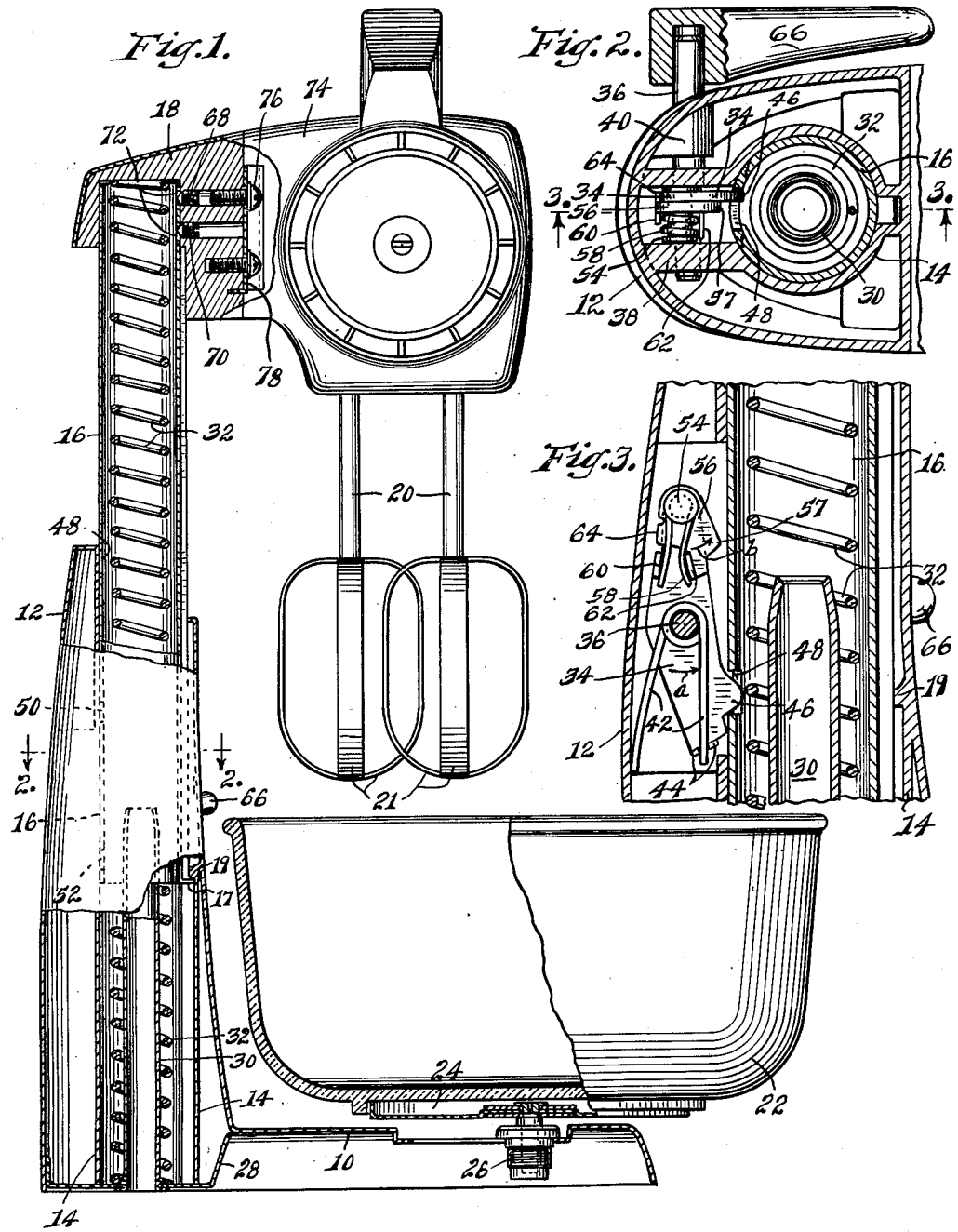

Inventor:
Alvin W. Holstein.
By Bair, Freeman & Molinare
Att'ys.

_United States Patent Office_

2,701,698
Patented Feb. 8, 1955

2,701,698

FOOD MIXER

Alvin W. Holstein, St. Louis, Mo., assignor to Knapp-Monarch Company, St. Louis, Mo., a corporation of Delaware Application February 18, 1952, Serial No. 272,036

5 Claims. (Cl. 248—13)

This invention relates to a food mixer and particularly to a construction which permits vertical lift of the mixer motor and the beaters to clear the bowl when removing it from the mixer as distinguished from the usual type wherein the motor is mounted on a pivoted arm that swings upwardly and rearwardly.

One object of the invention is to provide a vertical lift arrangement containing spring means to bias the mixer motor upwardly so that it does not have to be lifted manually.

Another object is to provide a telescoping arrangement for mounting the mixer with respect to a post at the back of the mixer bowl which is adaptable to contain a tensioned spring for counter-balancing and lifting the mixer motor.

Still another object is to provide manually operated mechanism for normally holding the telescoping post arrangement in the lowered position, the mechanism being manually releaseable for permitting the spring to act to elevate the mixer motor.

A further object is to provide an escapement arrangement in the mechanism to prevent a full-stroke upward movement of the mixer motor under the action of the spring, but rather to permit the upward movement in controlled steps and thus avoid an accumulation of momentum as the spring expands.

Still a further object is to provide a design of lift for a food mixer which permits relatively close mounting of a mixer motor to a support therefor so that the motor can be cross-mounted as disclosed in my copending application Serial No. 272,037, filed February 18, 1952.

With these and other objects in view, my invention consists in the construction, arrangement and combination of the various parts of my food mixer, whereby the objects contemplated are attained, as hereinafter more fully set forth, pointed out in my claims and illustrated in the accompanying drawings, wherein:

Figure 1 is a side elevation of a mixer embodying my present invention, some parts being broken away and other parts being shown in section, the mixer motor being in the elevated position.

Figure 2 is an enlarged horizontal sectional view on the line 2—2 of Figure 1.

Figure 3 is an enlarged vertical sectional view on the line 3—3 of Figure 2 showing an escapement mechanism in the normally locked position retaining the mixer lowered for operation.

Figure 4:
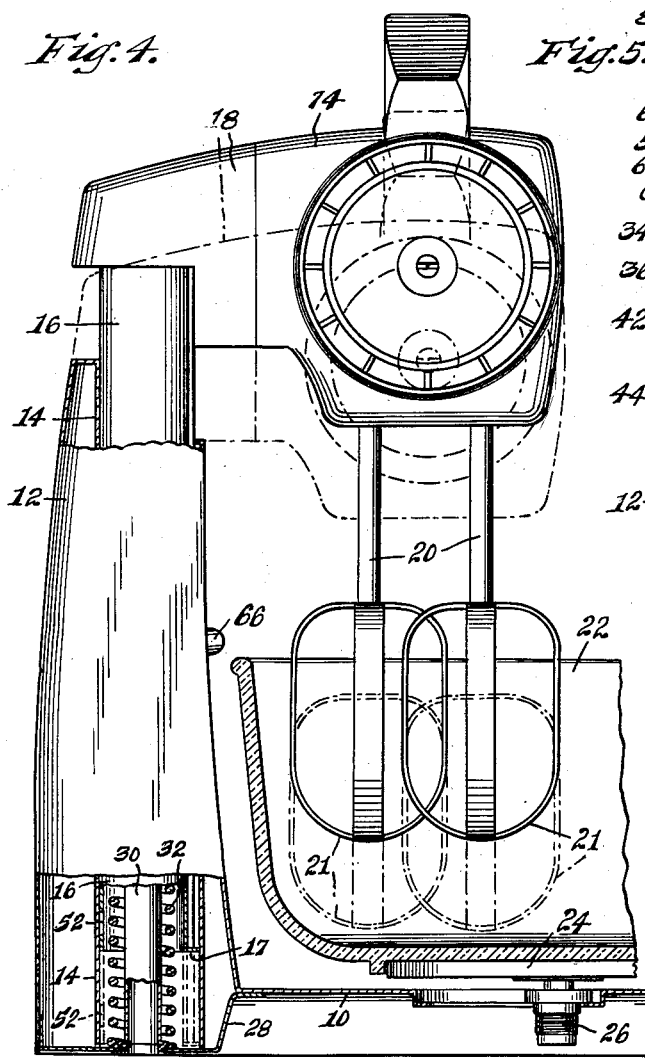
Figure 4 is another side elevation showing the mixer in the lowered position by dot-and-dash lines and in a partially raised position by solid lines as when the escapement mechanism is operated and the parts assume the position shown in Figure 6.

On the accompanying drawing I have used the reference numeral 10 to indicate the base of a food mixer, which base may be formed of a die casting and is provided with a tubular post 12 at the rear. This post on the outside may be of a suitable ornamental shape and on the inside it is provided with a cylindrical portion 14 in which a tube 16 is telescopically mounted. The tube 16 supports a head 18 on which a mixer motor housing 74 is mounted. The manner of securing the head 18 to the tube 16 is shown in Figure 1 and consists of a pair of set screws 68 and 70 having pointed ends entering enlarged openings 72 of the tube. Thus the head may be shifted upwardly or downwardly relative to the tube so that when the tube is latched in the lowered position shown in Figure 3, and by dot-and-dash lines in Figure 4, the head will just contact the top of the post 12 without an objectionable space between the two. The motor of the food mixer illustrated in Figure 1 includes the housing 74 which is secured to the head 18 as by screws 76 through a channel-shaped bracket 78 which in turn is secured to the motor housing.

Depending beater shafts 20 are shown in Figures 1 and 4 for cooperation with food in a mixer bowl illustrated at 22. The bowl is usually supported on a rotatable platform 24 in a bearing 26 mounted in the base 10.

Figure 5:
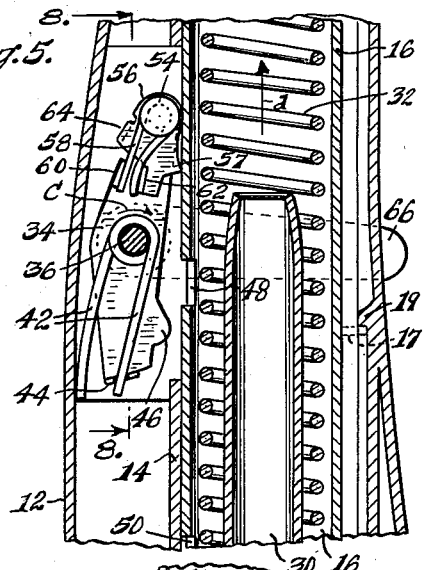
Figure 5 is a vertical sectional view similar to Figure 3 showing the result of a manual operation for releasing the escapement from the position shown in Figure 3, and showing the mixer motor starting to rise.

The present invention has particularly to do with a vertical lift type of mounting for the mixer head 18 including the telescopic connection between the cylinder 14 and the tube 16. Extending upwardly from a bracket 28 in the base 10 is a guide tube 30 for a spring 32. The spring is interposed in the space between the outside of the guide tube 30 and the inside of the tube 16. The upper end of the guide tube is turned in as illustrated in Figure 5 to insure proper collapse of the spring when the head 18 is pushed downwardly to the dot-and-dash line position shown in Figure 4 for a food mixing operation, at which time the beaters 21 on the beater shafts 20 are also in the dot-and-dash position for cooperation with the material being worked upon.

Figure 8:
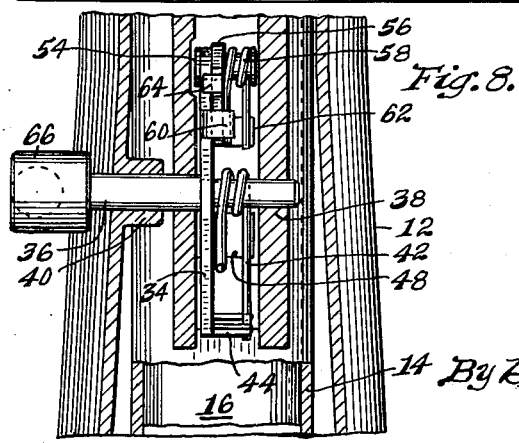
Figure 8 is a vertical sectional view on the line 8—8 of Figure 5.

I provide a combined latch and escapement mechanism for normally holding the tube 16 in the lowermost position as shown by dot-and-dash lines in Figure 4, its parts then being in the position shown in Figure 3. This mechanism comprises a primary lever 34 secured to a rock shaft 36 which, as shown in Figure 8, is mounted in bearings 38 and 40. The primary lever 34 is biased to rotate counter-clockwise in Figure 3 (see arrow a) by a spring 42 wrapped around the rock shaft 36 and having its ends engaging the back of the post 12 and a perforated ear 44.

The primary lever 34 has a projection 46 adapted to enter an opening 48 formed in the back of the tube 16. This tube has two other such openings indicated at 50 and 52 in Figure 1, the opening 48 being above them.

The primary lever 34 carries a pivot 54 for a secondary lever 56 which is biased by a spring 58 to also rotate counterclockwise as indicated by the arrow b in Figure 3, the spring engaging ears 60 and 62 on the primary lever 34 and the secondary lever 56 respectively. The secondary lever 56 has a stop lug 64 engaging the back of the primary lever 34 in the position shown in Figure 3 and a projection 57 to engage the openings 48, 50 and 52.

The rock shaft 36 is adapted to be manually rocked by a lever 66. Due to the bias of the spring 42, this lever is normally in the raised position of Figures 1 and 3.

Practical operation

With the parts in the position shown in Figure 1 it is possible to remove and replace the mixer bowl 22 which had adequate clearance under the beaters 21. When it is desirable to lower the beaters to the dot-and-dash line position of Figure 4, it is merely necessary to push downwardly on the head 18. The primary and secondary levers would at that time be in the position shown in Figure 3 with the projection 46 engaged in the lowermost opening of the tube 16. This would be the opening 52 which, it will be noted in Figure 1, is the opening just below the rock lever 66.

Since the primary lever 34 is biased counter-clockwise by the spring 42, it will permit a "ratcheting" action as the head 18 of the tube 16 is lowered. The upper edge of the opening 52 will push the projection 46 aside as to the position shown in Figure 7 and the projection will drop into the opening 50 when it registers therewith but will be pushed aside by its upper edge also as the tube and head continue in the downward movement. Finally, adjacent the lower limit of movement the projection 46 will drop into the opening 48 as in Figure 3 and the tube 16 will thus be latched in the lowered (dotted) position of Figure 4.

After using the mixer and when it is desirable to elevate the mixer motor, it is merely necessary to depress the lever 66 as shown in Figure 5 which will rotate the lever 34 (arrow c) and thus remove the projection 46 from the opening 48 as shown in Figure 5 and the spring 32 will start expanding and will raise the tube 16 and the head 18 together with the motor 74 and the beaters 21 (arrow d). Some upward movement is illustrated in Figure 5.

Figure 6:
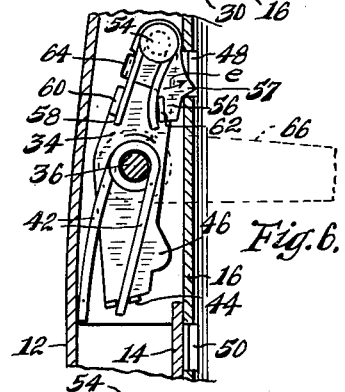
Figure 6 is a similar sectional view showing the mixer motor elevated one step of the escapement mechanism, this being the position shown by solid lines in Figure 4.
Figure 7:
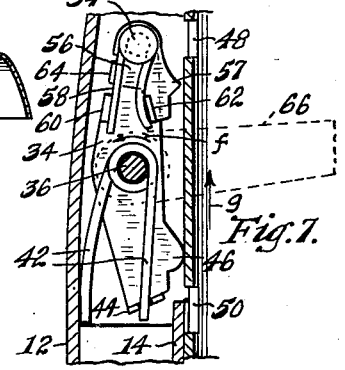
Figure 7 is a similar sectional view showing the next escapement operation consisting in releasing the escapement operating lever whereupon the mixer motor starts moving toward the second station of the escapement operation.

When the opening 48 registers with the projection 57 on the secondary lever 56, the projection will drop into the opening as shown by arrow e in Figure 6 under the bias of the spring 58. Thus the upward movement is arrested after approximately one-fourth of its travel and before the moving parts have gained prohibitive momentum under the expanding action of the spring 32. The operator then releases the lever 66 as shown in Figure 7 and the spring 42 will swing the primary lever 34 (see arrow f) to the position shown in Figure 7, thus releasing the projection 57 of the secondary lever 56 from the opening 48 and the tube will start upward movement again, as indicated by the arrow g. When the opening 50 registers with the projection 46, this projection will drop into the opening 50 and the primary and secondary levers will then again be in the position shown in Figure 3 after about another one-fourth of the travel.

The foregoing cycle, beginning with depression of the lever 66, is then repeated which will end with the opening 52 receiving the projection 46 and the beaters will be elevated to the position of Figure 1. A stop flange 17 on the lower end of the tube 16 at that time will be adjacent a stop shoulder 19 of the post 12 as shown by dotted lines in Figure 5 so that another depression of the lever 66 will not permit the spring 32 to push the tube 16 all the way out of the cylinder 14.

With the escapement arrangement illustrated, the spring is permitted to expand in steps instead of expanding the entire travel of the tube 16 at one time and I am thus able to permit the use of a spring to elevate the beaters without excessive shock as would be the case if the spring were permitted to completely expand all at one time.

Some changes may be made in the construction and arrangement of the parts of my food mixer without departing from the real spirit and purpose of my invention, and it is my intention to cover by my claims any modified forms of structure or use of mechanical equivalents which may be reasonably included within their scope.

I claim as my invention:

1. In a food mixer, a base, a tubular post extending upwardly therefrom, a tube telescopically mounted in said post, a mixer motor carried by said tube, spring means for elevating said tube and motor relative to said post, said tube having a series of vertically spaced openings therein, and escapement mechanism carried by said post for successive engagement with said openings to permit step-by-step upward movement of said tube relative to said post.

2. In a food mixer, a base, a tubular post extending upwardly therefrom, a tube telescopically mounted in said post, a mixer motor carried by said tube, spring means for elevating said tube and motor relative to said post, said tube having a series of vertically spaced openings, an escapement mechanism carried by said post and comprising a primary lever biased to engage in said openings, a secondary lever carried by said primary lever and also biased to engage in said openings, and a lever for moving said primary lever against its bias.

3. In a food mixer, a base, a tubular post extending upwardly therefrom, a tube telescopically mounted in said post, a mixer motor carried by said tube, spring means for elevating said tube and motor relative to said post, said tube having a series of vertically spaced openings therein, and manually operable escapement mechanism carried by said post for successive engagement with said series of spaced openings to permit step-by-step upward movement of said tube relative to said post.

4. In a food mixer, a base, a tubular post extending upwardly therefrom, a tube telescopically mounted in said post, a mixer motor carried by said tube, means biasing said tube and motor upwardly relative to said post, said tube having a series of vertically spaced openings, an escapement mechanism carried by said post and comprising a primary lever biased toward said tube and said openings therein, a secondary lever carried by said primary lever biased toward said tube and said openings therein, and manual means for moving said primary lever against its bias.

5. In a food mixer, a base, a tubular post extending upwardly therefrom, a tube telescopically mounted in said post, a mixer motor carried by said tube, spring means for elevating said tube and motor relative to said post, said tube having a series of vertically spaced openings, an escapement mechanism carried by said post and comprising a primary lever biased to engage in said openings, a secondary lever carried by said primary lever and also biased to engage in said openings, and a lever for moving said primary lever against its bias, said tube and motor being manually depressible for lowering the motor to position for operation, said escapement mechanism ratcheting during such lowering and operable to lock the motor in the lowered position.

References Cited in the file of this patent

UNITED STATES PATENTS

| | | |
|---|---|---|
| 1,064,070 | Gibbs | June 10, 1913 |
| 1,325,190 | Chodak | Dec. 16, 1919 |
| 2,329,932 | Nelson | Sept. 21, 1943 |